United States Patent
Bao et al.

(10) Patent No.: US 12,306,605 B2
(45) Date of Patent: May 20, 2025

(54) CALCULATING METHOD FOR NATURAL FREQUENCY OF TOOLHOLDER-TOOL SYSTEM OF MACHINE TOOL SPINDLE

(71) Applicant: Suzhou University of Science and Technology, Suzhou (CN)

(72) Inventors: Siyuan Bao, Suzhou (CN); Tingting Chang, Suzhou (CN); Jiahang Wang, Suzhou (CN)

(73) Assignee: Suzhou University of Science and Technology, Suzhou (CN)

( * ) Notice: Subject to any disclaimer, the term of this patent is extended or adjusted under 35 U.S.C. 154(b) by 416 days.

(21) Appl. No.: 17/994,214

(22) Filed: Nov. 25, 2022

(65) Prior Publication Data
US 2023/0315042 A1    Oct. 5, 2023

(51) Int. Cl.
    *G05B 19/00*      (2006.01)
    *G05B 19/404*     (2006.01)
    *G06F 17/13*      (2006.01)

(52) U.S. Cl.
    CPC ........... *G05B 19/404* (2013.01); *G06F 17/13* (2013.01); *G05B 2219/32015* (2013.01)

(58) Field of Classification Search
None
See application file for complete search history.

(56) References Cited

U.S. PATENT DOCUMENTS

| | | | |
|---|---|---|---|
| 2017/0153208 A1* | 6/2017 | Kawai | G01M 1/30 |
| 2018/0130489 A1* | 5/2018 | Cheng | B23Q 17/0976 |
| 2019/0162704 A1* | 5/2019 | Cheng | G01N 29/14 |

* cited by examiner

*Primary Examiner* — Paul B Yanchus, III
(74) *Attorney, Agent, or Firm* — Hemisphere Law, PLLC; Zhigang Ma

(57) ABSTRACT

A calculating method for natural frequency of toolholder-tool system of machine tool spindle is provided. The equivalence of bending stiffness of a toolholder part including that: a toolholder in the toolholder-tool system is a first segment, and section moment of inertia, elastic modulus, density, length and cross section area of the toolholder are $I_1$, $E_1$, $\rho_1$, $L_1$ and $A_1$ respectively; a tool part is a second segment, and section moment of inertia, elastic modulus, density, length and cross section area of the toolholder are $I_2$, $E_2$, $\rho_2$, $L_2$ and $A_2$ respectively; and assuming that the tool and the toolholder are closely fitted at contact surfaces without shedding and slipping. The calculating method can quickly and accurately calculate the vibration characteristic of toolholder-tool system of machine tool and provide a guide for optimizing the structure of the machine tool spindle or selecting suitable tools and toolholders.

1 Claim, 1 Drawing Sheet

CALCULATING METHOD FOR NATURAL FREQUENCY OF TOOLHOLDER-TOOL SYSTEM OF MACHINE TOOL SPINDLE

TECHNICAL FIELD

The disclosure relates to the field of mechanical technology, in particular to a calculating method for natural frequency of toolholder-tool system of machine tool spindle.

BACKGROUND

In engineering applications, such as the designing application of mechanical equipment and parts, mechanical milling has the characteristics of high production efficiency, wide range and high processing accuracy, but the vibration problem in a machining process of the mechanical milling limits the improvement of processing quality and efficiency. For example, slender end milling cutters are widely used in deep-hole machining and thin-wall parts machining Due to their large length-diameter ratios, their own stiffness is insufficient, which is easy to occur flutter phenomenon in the machining process. At present, some relatively practical vibration-damping tools on the market are the vibration-damping tools of SilentTool® series made by Sandvik Coromant, whose maximum length-diameter ratio within 80 millimetres (mm) diameter can reach 14, and the length diameter ratio of customized milling cutter can reach 16.

In mechanical engineering, the multi-segment beam structure with more than two segments is often used. Compared with the single-segment beam, the characteristic of the multi-segment beam structure is that the displacement and rotation angle between adjacent segments should maintain a certain continuity, and there is a coupling relationship. The influence of this coupling relationship on the vibration characteristic of the structure cannot be ignored.

Therefore, it is necessary to provide a calculating method for natural frequency of toolholder-tool system of machine tool spindle to solve the above technical problems.

SUMMARY

A purpose of the disclosure is to provide a calculating method for natural frequency of tool-toolholder system of machine tool spindle, which is a calculating method for the vibration characteristic of composite stepped beam based on Rayleigh-Ritz method. By making a reasonable assumption on the allowable functions of cantilever-beam deflection, the calculating method can make piecewise functions satisfy the continuity of physical quantities at joints, and can quickly and accurately calculate the vibration characteristic of tool-holder-tool system of machine tool. The disclosure can provide a guide for further optimizing the structure of the machine tool spindle or selecting suitable tools and toolholders, so as to solve the problems raised in the above background technology.

To achieve the above purpose, the disclosure provides following technical solutions including: performing equivalent of bending stiffness of a toolholder part, equivalence of material density of the toolholder part, equivalence of the toolholder-tool system, expression of displacement functions, solution of natural frequency, and frequency conversion, and thereby obtaining the natural frequency of the toolholder-tool system; and optimizing the machine tool spindle based on the natural frequency of the toolholder-tool system, and selecting a target tool and a target toolholder based on the natural frequency of the toolholder-tool system.

The equivalence of bending stiffness of a toolholder part including that: a toolholder in the toolholder-tool system is a first segment, and section moment of inertia, elastic modulus, density, length and cross section area of the toolholder are $I_1$, $E_1$, $\rho_1$, $L_1$ and $A_1$ respectively; a tool part is a second segment, and section moment of inertia, elastic modulus, density, length and cross section area of the toolholder are $I_2$, $E_2$, $\rho_2$, $L_2$ and $A_2$ respectively; assuming that interfaces between two materials of a composite beam of the toolholder part are connected completely, i.e., the tool and the toolholder are closely fitted at contact surfaces without shedding and slipping, bending of a whole stepped beam meets an assumption of plane section, and a neutral axis of a mixed section of the toolholder part passes through a center of a circular section, combining with the actual situation of the composite beam of the toolholder part, the equivalent bending stiffness $EI_{eq}$ on a cross section of the composite beam is obtained by the following formula (1):

$$EI_{eq}=E_1I_1+E_2I_2 \qquad (1);$$

where $E_1I_1$ and $E_2I_2$ represent bending stiffness of the two materials of the toolholder and the tool respectively.

According to knowledge of material mechanics, inertia moment of two circular sections are $$I_1 = \frac{\pi r_1^4}{4} \text{ and } I_2 = \frac{\pi r_2^4}{4}$$

respectively, and equivalent elastic modulus $E_{eq}$ on the cross section of the composite beam of the toolholder part is obtained by the following formula (2):

$$E_{eq} = \frac{E_1 r_1^4 + E_2(r_2^4 - r_1^4)}{r_2^4} = E_2 - (E_2 - E_1)\frac{r_1^4}{r_2^4}; \qquad (2)$$

The equivalence of material density of the toolholder part including that: a shape of the cross section of the composite beam is composed of a circle and a circular ring, and centroids of the circle and the circular ring coincide; the equivalent material density $\rho_{eg}$ of the toolholder part is obtained by the following formula (3):

$$\rho_{eq} = \frac{\rho_1 A_1 + \rho_2 A_2}{A_1 + A_2} = \rho_2 - (\rho_2 - \rho_1)\frac{r_1^4}{r_2^4}; \qquad (3)$$

where $\rho_1$ and $\rho_2$ represent the material density of the toolholder and the tool respectively; $A_1$ and $A_2$ represent the cross section area of the toolholder and the tool respectively, and $A_1=\pi r_1^2$ and $A_2=\pi r_2^2$; $r_2$ represents a radius of the cross section of the tool and $r_1$ represents a radius corresponding to a distance from a centroid of the cross section of the toolholder to an outer edge of the toolholder.

The equivalence of the toolholder-tool system including that: an inside part of the tool and the toolholder are equivalent to the first segment; section moment of inertia, equivalent elastic modulus, equivalent density, length and cross section area of the equivalent first segment are $I_1$, $E_{eq1}$, $\rho_{eq1}$, $L_1$ and $A_1$ respectively; an outside part of the tool is the second segment, elastic modulus, density, length and cross section area of the second segments are $E_2$, $\rho_2$, $L_2$ and $A_2$ respectively.

The expression of displacement functions including that:
for a multi-segment Euler beam structure, a vibration equation of beams is a fourth-order differential equation, the displacement functions are expressed by a piecewise function to simplify the calculation and eliminate discontinuity of mechanical variables at ends of beam segments; the displacement functions $w_1(x)$ and $w_2(x)$ for deflection of a two-segment stepped cantilever beam are obtained by the following formula (4):

$$\begin{cases} w_1(x) = a_1\sin^2(\lambda_1 x) + a_2\sin^2(\lambda_2 x) & 0 \le x \le L_1 \\ w_2(x) = w_1(x) + \delta(x-L_1)\left[(x-x_0)^2(a_3 + a_4 x + a_5 x^2)\right] & L_1 \le x \le L \end{cases} \quad (4)$$

where $x \in [0, L]$; $a_1$, $a_2$, $a_3$, $a_4$, and $a_5$ are constants to be determined; $\lambda_n = (2n-1)\pi/4L$; and L represents a sum of length of the first segment and the second segment.

when the formula (1) is used to express a beam deflection, displacements and slopes on both sides at an abrupt changing position of the cross section are equal; the piecewise function is used to represent the displacement functions of the two-segment stepped cantilever beam, the displacement functions $w_1(x)$ and $w_2(x)$ and first-order derivatives corresponding to the slopes thereof keep continuous at the abrupt changing position of the cross section, which is consistent with the actual situation; second derivatives corresponding to section bending moment and third derivatives corresponding to section shear force of the displacement functions $w_1(x)$ and $w_2(x)$ keep discontinuous at the abrupt changing position of the section, which is also consistent with the actual situation.

the solution of natural frequency including:
obtaining two potential energy in a continuous two-segment Euler beam structure by the following formula (5):

$$V_p = \frac{1}{2} E_{eq1} I_1 \int_0^{L_1} \left(\frac{d^2 w_1}{dx^2}\right)^2 dx + \frac{1}{2} E_2 I_2 \int_{L_1}^{L} \left(\frac{d^2 w_1}{dx^2}\right)^2 dx; \quad (5)$$

where $V_p$ is strain energy of continuous multi-segment beam structure under arbitrary boundary conditions; $E_i$ and $I_i$ are elastic modulus and section moment of inertia in a i-th segment of a beam, where i=1, 2.

Without considering of mass of restraining springs, kinetic energy of a continuous stepped composite beam is obtained by the following formula (6):

$$T = \frac{\omega^2}{2}\left[\rho_{eq1} A_1 \int_0^{L_1} w_1^2 dx + \rho_2 A_2 \int_{L_1}^{L} w_2^2 dx\right]. \quad (6)$$

Lagrange function of the continuous multi-segment beam structure is obtained by the following formula (7):

$$L = V - T \quad (7);$$

where V represents the potential energy of the continuous multi-segment beam structure, and T represents the kinetic energy of the continuous multi segment beam structure.

The formulas from (4) to (6) are substituted into the formula (7) to obtain the following expression formula (8) of the Lagrange function L:

$$L = \frac{1}{2} E_{eq1} I_1 \int_0^{L_1} \left(\frac{d^2 w_1}{dx^2}\right)^2 dx + \frac{1}{2} E_2 I_2 \int_{L_1}^{L} \left(\frac{d^2 w_1}{dx^2}\right)^2 dx - \frac{\omega^2}{2}\left[\rho_{eq1} A_1 \int_0^{L_1} w_1^2 dx + \rho_2 A_2 \int_{L_1}^{L} w_2^2 dx\right]. \quad (8)$$

Based on Rayleigh-Ritz method, the Lagrange function is used to take extreme value for the constants to be determined by the following formula (9):

$$\frac{dL}{da_i} = 0; \quad (9)$$

where i=(1, 2, 3, 4, 5).

Five linear equations are obtained from the formula (9), and the five linear equations are written in matrix form to obtain the following formula (10):

$$(K - \omega^2 M)A = 0 \quad (10);$$

where K represents a stiffness matrix; M represents a mass matrix; $\omega$ represents circular frequency; A represents a column vector composed of unknown coefficients in the formula (4), that is:

$$A = [a_1, a_2, a_3, a_4, a_5]^T \quad (11).$$

In order to obtain specific equations of the stiffness matrix K and the mass matrix M, substituting basic functions according to the formula (4) by the following formula (12):

$$\begin{cases} f_1 = \sin^2(\lambda_1 x) \\ f_2 = \sin^2(\lambda_2 x) \\ f_3 = (x - L_1)^2 \\ f_4 = x(x - L_1)^2 \\ f_5 = x^2(x - L_1)^2 \end{cases} \quad (12)$$

Then substituting matrices of intermediate basic functions by the following formulas (13) to (16):

$$F_{e1} = 4\begin{bmatrix} \lambda_1^2 \sin^2(2\lambda_1 x) & \lambda_1\lambda_2\sin(2\lambda_1 x)\sin(2\lambda_2 x) & 0 & 0 & 0 \\ \lambda_1\lambda_2\sin(2\lambda_1 x)\sin(2\lambda_2 x) & \lambda_2^2\sin^2(2\lambda_2 x) & 0 & 0 & 0 \\ 0 & 0 & 0 & 0 & 0 \\ 0 & 0 & 0 & 0 & 0 \\ 0 & 0 & 0 & 0 & 0 \end{bmatrix}; \quad (13)$$

$$M_{e1} = \begin{bmatrix} \sin^4(\lambda_1 x) & \sin^2(\lambda_1 x)\sin^2(\lambda_2 x) & 0 & 0 & 0 \\ \sin^2(\lambda_1 x)\sin^2(\lambda_2 x) & \sin^4(\lambda_2 x) & 0 & 0 & 0 \\ 0 & 0 & 0 & 0 & 0 \\ 0 & 0 & 0 & 0 & 0 \\ 0 & 0 & 0 & 0 & 0 \end{bmatrix};$$ (14)

$$F_{e2} = \begin{bmatrix} \left(\frac{d^2 f_1}{dx^2}\right)^2 & \frac{d^2 f_1}{dx^2}\frac{d^2 f_2}{dx^2} & \cdots & \frac{d^2 f_1}{dx^2}\frac{d^2 f_5}{dx^2} \\ \frac{d^2 f_2}{dx^2}\frac{d^2 f_1}{dx^2} & \left(\frac{d^2 f_2}{dx^2}\right)^2 & \cdots & \frac{d^2 f_2}{dx^2}\frac{d^2 f_5}{dx^2} \\ \vdots & \vdots & \vdots & \vdots \\ \frac{d^2 f_5}{dx^2}\frac{d^2 f_1}{dx^2} & \frac{d^2 f_5}{dx^2}\frac{d^2 f_2}{dx^2} & \cdots & \left(\frac{d^2 f_5}{dx^2}\right)^2 \end{bmatrix};$$ (15)

$$M_{e2} = \begin{bmatrix} f_1^2 & f_1 f_2 & \cdots & f_1 f_5 \\ f_2 f_1 & f_2^2 & \cdots & f_2 f_5 \\ \vdots & \vdots & \vdots & \vdots \\ f_5 f_1 & f_5 f_2 & \cdots & f_5^2 \end{bmatrix} = \begin{bmatrix} \sin^4(\lambda_1 x) & \sin^2(\lambda_1 x)\sin^2(\lambda_2 x) & \sin^2(\lambda_1 x)(x-L_1)^2 & x\sin^2(\lambda_1 x)(x-L_1)^2 & x^2\sin^2(\lambda_1 x)(x-L_1)^2 \\ \sin^2(\lambda_1 x)\sin^2(\lambda_2 x) & \sin^4(\lambda_2 x) & \sin^2(\lambda_2 x)(x-L_1)^2 & x\sin^2(\lambda_2 x)(x-L_1)^2 & x^2\sin^2(\lambda_2 x)(x-L_1)^2 \\ \sin^2(\lambda_1 x)(x-L_1)^2 & \sin^2(\lambda_2 x)(x-L_1)^2 & (x-L_1)^4 & x(x-L_1)^4 & x^2(x-L_1)^4 \\ \sin^2(\lambda_1 x)x(x-L_1)^2 & \sin^2(\lambda_2 x)x(x-L_1)^2 & x(x-L_1)^2 & x^2(x-L_1)^4 & x^3(x-L_1)^4 \\ \sin^2(\lambda_1 x)x^2(x-L_1)^2 & \sin^2(\lambda_2 x)x^2(x-L_1)^2 & x^2(x-L_1)^4 & x^3(x-L_1)^4 & x^4(x-L_1)^4 \end{bmatrix}.$$ (16)

Therefore, the stiffness matrix K of a stepped beam is obtained by the following formula (17):

$$K = E_{eq1} I_1 \int_0^{L_1} F_{e1} dx + E_2 I_2 \int_{L_1}^{L} F_{e2} dx \quad (17).$$

As a similar situation, the mass matrix M of the stepped beam is obtained by the following formula (18):

$$M = \rho_{eq1} A_1 \int_0^{L_1} M_{e1} dx + \rho_2 A_2 \int_{L_1}^{L} M_{e2} dx \quad (18).$$

A condition for the formula (10) to have at least one non-zero solution is:

$$|K - \omega^2 M| = 0 \quad (19).$$

Natural frequency of the two-segment stepped cantilever beam can be obtained by solving a matrix eigenvalue problem. Eigenvectors corresponding to the natural frequency are substituted into the formula (4) to obtain a vibration mode of the two-segment stepped cantilever beam.

The frequency conversion including that: a basic governing equation of a single-span Timoshenko beam is:

$$EI\frac{\partial^4 w}{\partial x^4} + \rho A \frac{\partial^2 w}{\partial t^2} - \rho I\left(1 + \frac{E}{k'G}\right)\frac{\partial^4 w}{\partial x^2 \partial t^2} + \frac{\rho^2 I}{k'G}\frac{\partial^4 w}{\partial t^4} = 0. \quad (20)$$

Influences of shear deformation and moment of inertia on a natural frequency of a Timoshenko beam are estimated by a simple supported beam. Then a relationship between natural frequency of the Timoshenko beam and a Euler-Bernoulli beam is derived according to a frequency formula of a Timoshenko simple supported beam.

A deflection function of the simple supported beam is taken as $$w = \sin\frac{i\pi x}{L},$$

and the deflection function is substituted into the formula (20) to obtain the following formula (21):

$$EI\frac{\partial^4 w}{\partial x^4} - \rho A \omega_T^2 w + \rho I\left(1 + \frac{E}{k'G}\right)\omega_T^2 \frac{\partial^2 w}{\partial x^2} + \frac{\rho^2 I}{k'G}\omega_T^4 w = 0; \quad (21)$$

where $\omega_T$ represents a natural frequency of bending vibration of the stepped beam based on Timoshenko beam theory, and a unit of $\omega_T$ is radians per second (rad/s).

By ignoring a last term on a left end of the formula (21) containing small coefficients, and $$\frac{\partial^2 w}{\partial x^2} = -\left(\frac{i\pi}{L}\right)^2 w$$

is substituted into the formula (21) to obtain the following formula (22):

$$EI\frac{\partial^4 w}{\partial x^4} - \rho A \omega_T^2 w - \rho I\left(1 + \frac{E}{k'G}\right)\left(\frac{i\pi}{L}\right)^2 w = 0. \quad (22)$$

The following formula (23) is obtained based on Euler-Bernoulli beam theory:

$$EI\frac{\partial^4 w}{\partial x^4} - \rho A \omega_T^2 w = 0; \quad (23)$$

where $\omega_E$ represents a circular frequency of bending vibration of the stepped beam based on the Euler-Bernoulli beam theory; and a unit of $\omega_E$ is rad/s; substituting the formula (23) into the formula (22) to obtain the following formula (24):

$$\rho A(\omega_E^2 - \omega_T^2)w - \rho I\left(1 + \frac{E}{k'G}\right)\left(\frac{i\pi}{L}\right)^2 w = 0; \quad (24)$$

Since $$\frac{\partial^2 w}{\partial x^2} = -\left(\frac{i\pi}{L}\right)^2 w \text{ and } \frac{I}{A} = \left(\frac{D}{4}\right)^2$$

when the cross section is a circle, the following formula (25) is obtained:

$$\omega_{Ti} = \omega_{Ei} \Big/ \sqrt{1 + \left(1 + \frac{E}{k'G}\right)\left(\frac{i\pi D}{4L}\right)^2}. \qquad (25)$$

For the two-segment stepped cantilever beam, diameters D, E and G are approximately taken as average values of corresponding values of two cross sections or materials, that is:

$$\begin{cases} D = \dfrac{D_1 + D_2}{2} \\ E = \dfrac{E_1 + E_2}{2} \\ G = \dfrac{G_1 + G_2}{2} \end{cases} \qquad (26)$$

Therefore, the following conversion formula (27) is obtained between the natural frequency of the Timoshenko beam and the Euler-Bernoulli beam:

$$f_{Ti} = f_{Ei} \Big/ \sqrt{1 + \left(1 + \frac{E_1 + E_2}{k'(G_1 + G_2)}\right)\left(i\pi \frac{D_1 + D_2}{8L}\right)^2}; \qquad (27)$$

where $f_{Ti}$ represents the natural frequency of bending vibration of a i-th order of the stepped beam obtained by a correction calculation based on the Timoshenko beam theory; $f_{Ei}$ represents the natural frequency of bending vibration of a i-th order of the stepped beam obtained by a calculation of the formula (19) based on the Euler-Bernoulli beam theory; both units of $f_{Ti}$ and $f_{Ei}$ are hertz (Hz).

$$\sqrt{1 + \left(1 + \frac{E_1 + E_2}{k'(G_1 + G_2)}\right)\left(i\pi \frac{D_1 + D_2}{8L}\right)^2}$$

of the formula (27) can be recorded as a conversion coefficient, which takes into account main effects of moment of inertia and shear deformation; results of four embodiments show that errors of obtained results are reduced, and the deflection function of the whole beam can be used to solve the natural vibration problem of the continuous multi-segment beam under the arbitrary boundary conditions.

Compared with the prior art, the disclosure has following beneficial effects.

The disclosure provides a method for calculating the vibration characteristic of a composite stepped beam based on Rayleigh Ritz method. Based on the reasonable assumption of the allowable functions of the cantilever beam deflection, the piecewise functions can satisfy the continuity of the physical quantities at the joints, which can quickly and accurately calculate the vibration characteristic of the toolholder-tool system of the machine tool, and the disclosure can provide a guide for further optimizing the structure of the machine tool spindle or selecting suitable tools and toolholders, so as to solve the problems raised in the above background technology.

In the study of beam bending theory, in order to adapt to the deflection of cantilever beam. The basic functions of the calculating method in the disclosure is in a form of trigonometric function when Rayleigh Ritz method is applied, and the convergence speed of the natural frequency is fast.

The disclosure properly uses the Timoshenko beam theory to study the toolholder-tool system of the machine tool, and establishes the equivalent conversion formulas based on the each order natural frequency from the Euler beam model to the Timoshenko beam model. The analytical results verify the effectiveness of the disclosure, and the error of the disclosure is generally within the allowable range of a project.

DETAILED DESCRIPTION OF EMBODIMENTS

In combination with the drawings in the embodiments of the disclosure, the technical solutions in the embodiments of the disclosure will be described clearly and completely. Obviously, the described embodiments are only some embodiments of the disclosure, not all of them. Based on the embodiments of the disclosure, all other embodiments obtained by ordinary those skilled in the art without creative work should belong to the protection scope of the disclosure.

Figure 1:
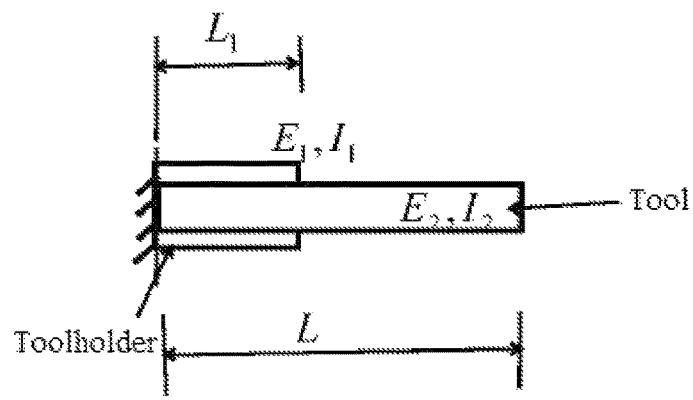
FIG. 1 shows an original model of a toolholder-tool system.
Figure 2:
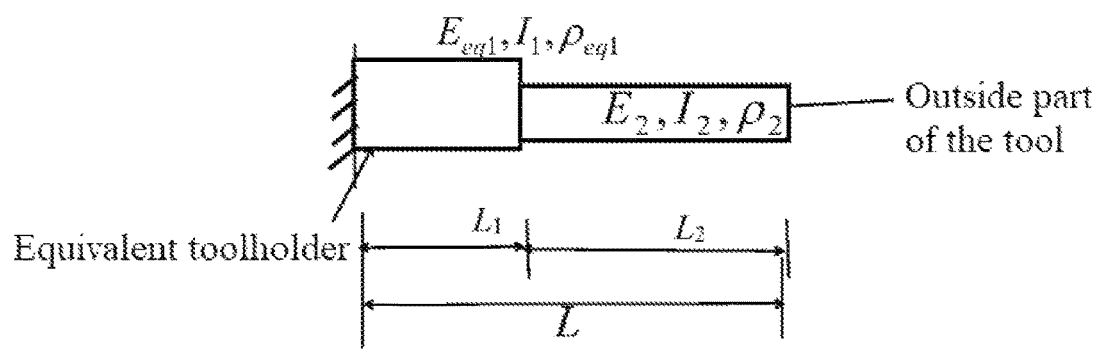
FIG. 2 shows an equivalent model of a two-segment beam of the tool holder system.
Figure 3:
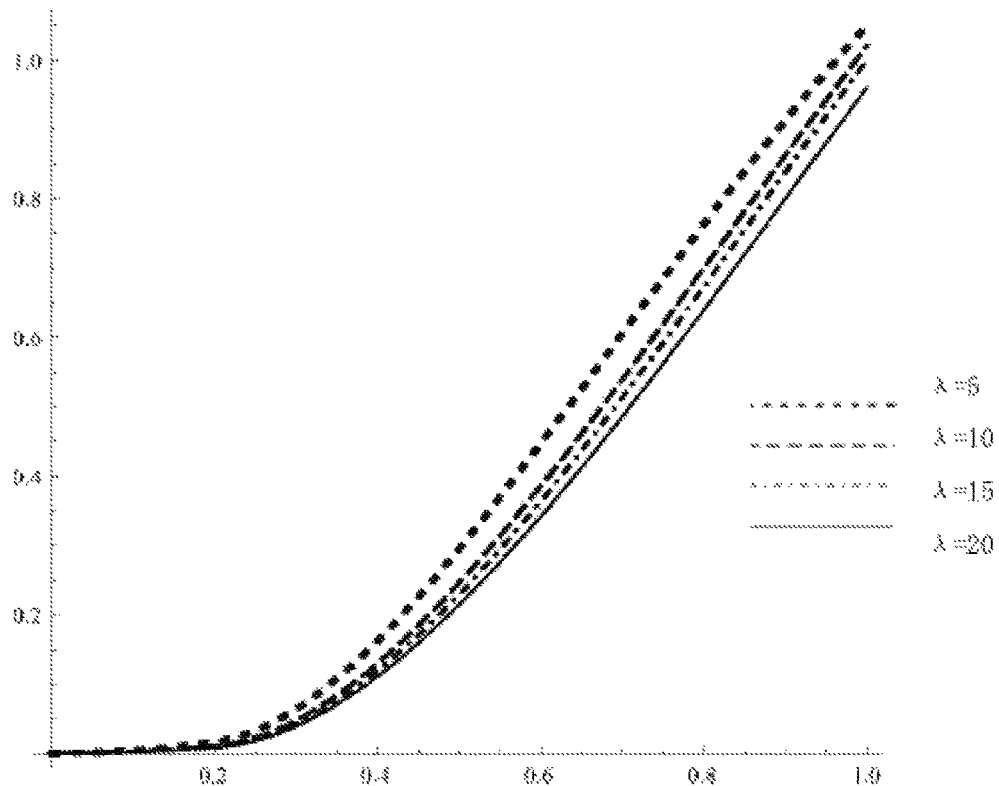
FIG. 3 shows a modal diagram of a stepped beam with different length-diameter ratios.

Please refer to FIG. 1-3, an embodiment is provided by the disclosure: a calculation method of the natural frequency of the machine tool spindle tool holder tool system described below.

Numerical Calculation and Analysis

Three embodiments of the disclosure are studies on the natural frequency of a two-segment cantilever beam (also referred to a two-segment beam), and Euler beam theory is used in the calculation. Timoshenko beam theory is used in the last embodiment for a specific toolholder-tool system.

Embodiment 1

For the correctness of the method of the disclosure verified by a two-segment beam. Referring to FIG. 3, when selected sections are circular sections, L=0.15 m (also referred to a total length composed of $L_1$ and $L_2$), $E_{eq1}=E_2=210$ GPa, $\rho_{eq1}=\rho_2=7800$ kg/m³. Under a cantilever boundary condition, a diameter $d_1$ of a circular section of a first-segment beam is 40 mm, and a diameter $d_2$ of a circular section of a second-segment beam is 20 mm, 30 mm, and 35 mm. When a ratio of a first-segment beam length $L_1$ and a second-beam length $L_2$ is different, first-order natural frequency obtained by the method are compared with analytical results. It can be seen from TABLE 1 that the first-order natural frequency of a multi-segment beam under the cantilever boundary condition start to increase with decreases of $L_1/L_2$, and decreases when $L_1/L_2$ is close to 1. When $d_2$ is closer to $d_1$, the first order natural frequency of $L_1/L_2 \leqslant 1$ is closer to the analytical results.

TABLE 1 changes of natural frequency of the two-segment beam with $L_1/L_2$ under a C-F boundary condition

| $d_2$ | $\omega$ (rad/s) | 8 | 3.5 | 2 | 1.75 | 1.25 | 1 | 0.5 | 0.2 |
|---|---|---|---|---|---|---|---|---|---|
| 20 | Analytic method | 9574.61 | 11217.2 | 12654.7 | 13055.7 | 12584.2 | 11691.9 | 8198.11 | 5656.26 |
|    | The method of the disclosure | 9599.35 (0.26%) | 11255.1 (0.34%) | 12698.2 (0.34%) | 12950.3 (−0.81%) | 12606.4 (0.18%) | 11703.6 (0.10%) | 8200.67 (0.03%) | 5657.15 (0.02%) |
| 30 | Analytic method | 8876.48 | 9556.34 | 10044.8 | 10125.6 | 10191.1 | 10090.8 | 9109.15 | 7580.81 |
|    | The method of the disclosure | 8896.96 (0.23%) | 9580.72 (0.26%) | 10069 (0.24%) | 10148.6 (0.28%) | 10209 (0.18%) | 10104.5 (0.14%) | 9113.15 (0.04%) | 7582.1 (0.02%) |
| 35 | Analytic method | 8494.57 | 8796.66 | 8994.52 | 9027.12 | 9062.28 | 9038.4 | 8707.97 | 8015.87 |
|    | The method of the disclosure | 8513.02 (0.22%) | 8816.5 (0.23%) | 9013.38 (0.21%) | 9045.15 (0.20%) | 9077.09 (0.16%) | 9050.49 (0.13%) | 8712.5 (0.05%) | 8019.25 (0.04%) |

Embodiment 2

A two-segment beam having circular sections under a cantilever boundary condition is selected. Referring to FIG. 3, $L_1=0.117$ m, $L_2=0.033$ m, $E_{eq1}=E_2=210$ GPa, $\rho_{eq1}=\rho_2=7800$ kg/m$^3$. A diameter $d_1$ of a circular section of a first-segment beam is 40 mm, then changing a ratio of the diameter $d_1$ of a circular section of a first-segment beam and a diameter $d_2$ of a circular section of a first-segment beam, and first-order natural frequency obtained by the method are compared with analytical results. It can be seen from TABLE 2 that the first-order natural frequency of a multi-segment beam under the cantilever boundary condition decrease with decreases of $d_1/d_2$.

TABLE 2 changes of natural frequency of the two-segment beam with $d_1/d_2$ under a C-F boundary condition.

| $\omega$ (rad/s) | 7 | 6 | 5 | 4 | 3 | 2 | 1 | 0.5 |
|---|---|---|---|---|---|---|---|---|
| Analytic method | 13048.9 | 12981.1 | 12864.7 | 12653.0 | 12222.5 | 11184.0 | 8108.31 | 4738.1 |
| The method of the disclosure | 13109.4 | 13040.7 | 12922.7 | 12708 | 12271.8 | 11221.6 | 8124.75 | 4744.3 |
| Relative error(%) | 0.464 | 0.46 | 0.451 | 0.435 | 0.403 | 0.363 | 0.203 | 0.131 |

Embodiment 3

A two-segment beam having circular sections under a cantilever boundary condition is selected. Referring to FIG. 3, $L_1=0.117$ m, $L_2=0.033$ m, $\rho_{eq1}=\rho_2=7800$ kg/m$^3$. Under the cantilever boundary condition, when sections of the two-segment beam do not change while only materials of the two-segment beam change (that is $I_1/I_2=1$), then TABLE 3 shows changes of natural frequency of the two-segment beam with elastic modulus.

When the sections and the materials of the two-segment beam all change (that is a ration of $E_{eq1}I_1$ and $E_2I_2$ changes), first-order natural frequency obtained by the method are compared with analytical results. It can be seen from TABLE 4 that relative errors of the first-order natural frequency obtained by the method are in a small range. Among them, a diameter $d_1$ of a circular section of a first-segment beam is 40 mm and a diameter $d_2$ of a circular section of a second-segment beam is 38 mm.

TABLE 3 changes of natural frequency of the two-segment beam with elastic modulus.

| $E_{eq1}$(Gpa) | $E_2$(Gpa) | The method of the disclosure $\omega$ (rad/s) |
|---|---|---|
| 127 | 70 | 6515.56 |
| 206 | 120 | 8043.89 |
| 108 | 68 | 5824.71 |
| 145 | 103 | 6749.77 |
| 206 | 173 | 8046.17 |

TABLE 4 changes of natural frequency of the two-segment beam with materials and sections of the two-segment beam.

| $E_{eq1}$(Gpa) | $E_2$(Gpa) | $E_1I_1/E_2I_2$ | Analytic method ω (rad/s) | The method of the disclosure ω (rad/s) | Relative error |
|---|---|---|---|---|---|
| 127 | 70 | 2.227 | 6508.14 | 6521.86 | 0.211 |
| 206 | 120 | 2.108 | 8289.24 | 8306.71 | 0.211 |
| 108 | 68 | 1.949 | 6002.42 | 6015.08 | 0.211 |
| 145 | 103 | 1.729 | 6955.79 | 6970.46 | 0.211 |
| 206 | 173 | 1.462 | 8291.84 | 8309.83 | 0.211 |

Embodiment 4

A toolholder-tool system of machine tool spindle simplifies assembly of a milling cutter and a toolholder into a cantilever stepped beam structure. The assembly is simplified as a two-segment composite stepped beam structure (also referred to a composite stepped beam), and its sizes, sectional areas and other physical parameters are shown in TABLE 5.

TABLE 5 physical parameters of the two-segment composite stepped beam structure.

| Physical parameters | Tool | Toolholder |
|---|---|---|
| Material | Hard alloy | Heat-resisting steel |
| Density/(kg/m³) | 14500 | 7860 |
| Elastic modulus (Gpa) | 550 | 260 |
| Shear modulus (Gpa) | 211.5 | 100 |
| Poisson's ratio | 0.33 | 0.33 |
| Length (m) | 0.2, 0.3, 0.4, 0.5 | 0.1 |
| Diameter (m) | 0.02 | 0.05 |

The length-diameter ratio of the tool is changed by changing the length of the tool without changing the diameter of the tool. The TABLE 5 shows that when the length of the tool is 0.2 m, 0.3 m, 0.4 m and 0.5 in respectively, the corresponding length-diameter ratio of an outside part of the tool is 5, 10, 15 and 20 respectively.

The physical parameters of the composite stepped beam are solved by the above method. Firstly, equivalent elastic modulus and equivalent density of the a composite beam of a toolholder part are solved by equation (2) and equation (3) respectively, and $E_{eq1}$=214. 81 GPa and $\rho_{eq1}$=8922.4 kg/m³ are obtained. Then, according to the method of the disclosure, second-order natural frequency of the composite stepped beam are calculated as shown in Table 6, and a corresponding vibration mode is shown in FIG. 3. Among them, results based on Euler beam model in the disclosure are obtained from equation (19), and results based on Timoshenko beam model in the disclosure are obtained from equation (27).

As shown in TABLE 6, compared with results of the analytic method, it can be seen that the maximum relative error of the first-order natural frequency based on the Euler beam model in the disclosure is 0.03%, and the maximum relative error of the second-order natural frequency based on the Euler beam model in the disclosure is 1.21%. At the same time, the maximum relative error of the first-order natural frequency based on the Timoshenko beam model in the disclosure is 1.98%, and the maximum relative error of the second-order natural frequency based on the Timoshenko beam model in the disclosure is 4.45%. Therefore, the effectiveness of the calculating method in the disclosure is verified under the Euler beam model and the Timoshenko beam model.

TABLE 6 changes of natural frequency of the composite stepped beam with different length-diameter ratios.

| Frequency (Hz) | Length-diameter ratio | 5 | 10 | 15 | 20 | Maximum relative error compared with analytical method |
|---|---|---|---|---|---|---|
| First-order natural frequency | The disclosure (Euler beam model) | 1229.27 | 385.463 | 179.75 | 103.12 | 0.03% |
| | Analytical method (Euler beam model) | 1228.3 | 385.4 | 179.7 | 103.1 | |
| | The disclosure (Timoshenko beam model) | 1152.14 | 371.28 | 175.43 | 101.38 | −1.98% |
| | Analytical method (Timoshenko beam model) | 1175.5 | 378.4 | 178.8 | 102.8 | |

TABLE 6-continued changes of natural frequency of the composite stepped beam with different length-diameter ratios.

| Frequency (Hz) | Length-diameter ratio | 5 | 10 | 15 | 20 | Maximum relative error compared with analytical method |
|---|---|---|---|---|---|---|
| Second-order natural frequency | The disclosure (Euler beam model) | 3653.88 | 1953.24 | 1054.33 | 628.62 | 1.21% |
| | Analytical method (Euler beam model) | 3610.2 | 1933.4 | 1044.5 | 622.5 | |
| | The disclosure (Timoshenko beam model) | 2931.54 | 1705.67 | 962.762 | 589.18 | −4.45% |
| | Analytical method (Timoshenko beam model) | 3060.6 | 1781.0 | 1007.6 | 610.4 | |

TABLE 7 changes of natural frequency of the toolholder-tool system with the length of the toolholder and the length-diameter ratio of the outside part of the tool.

| Frequency (Hz) | Length of the toolholder | Length diameter ratio | | | |
|---|---|---|---|---|---|
| | | 5 | 10 | 15 | 20 |
| First-order natural frequency | $L_1 = 0.05$ m | 1541.85 | 412.47 | 186.46 | 105.68 |
| | $L_1 = 0.1$ m | 1228.3 | 385.4 | 179.7 | 103.1 |
| | $L_1 = 0.15$ m | 866.57 | 350.05 | 171.32 | 100.01 |
| Second-order natural frequency | $L_1 = 0.05$ m | 7812.96 | 2514.5 | 1162.9 | 663.30 |
| | $L_1 = 0.1$ m | 3653.88 | 1953.24 | 1054.33 | 628.62 |
| | $L_1 = 0.15$ m | 2418.2 | 1295.2 | 868.11 | 570.92 |

TABLE 7 shows the natural frequency of the toolholder-tool system when the length of the toolholder varies by 0.05 m, 0.1 m and 0.15 m, and the length-diameter ratio of the outside part of the tool varies by 5, 10, 15 and 20. It can be seen that the natural frequency of the toolholder-tool system decrease gradually when the length of the toolholder increases.

For those skilled in the art, it is obvious that the disclosure is not limited to the details of the above embodiments and the disclosure can be realized in other specific forms without departing from the spirit or basic features of the disclosure. Therefore, the above embodiments should be regarded as exemplary and non-limiting. The protection scope of the disclosure is claimed by the appended claims rather than the above description. Therefore, all changes falling within the equivalent meaning and scope of the claims should be included in the disclosure, and any reference marks in the claims should not be regarded as a limitation on the claims involved.

What is claimed is:

1. A calculating method for natural frequency of toolholder-tool system of machine tool spindle, comprising: performing equivalence of bending stiffness of a toolholder part, equivalence of material density of the toolholder part, equivalence of the toolholder-tool system, expression of displacement functions, solution of natural frequency, and frequency conversion, and thereby obtaining the natural frequency of the toolholder-tool system; and optimizing the machine tool spindle based on the natural frequency of the toolholder-tool system, and selecting a target tool and a target toolholder based on the natural frequency of the toolholder-tool system;

wherein the equivalence of bending stiffness of a toolholder part comprising that: a toolholder in the toolholder-tool system is a first segment, and section moment of inertia, elastic modulus, density, length and cross section area of the toolholder are $I_1$, $E_1$, $\rho_1$, $L_1$ and $A_1$ respectively; a tool part is a second segment, and section moment of inertia, elastic modulus, density, length and cross section area of the toolholder are $I_2$, $E_2$, $\rho_2$, $L_2$ and $A_2$ respectively; assuming that interfaces between two materials of a composite beam of the toolholder part are connected completely, i.e., the tool and the toolholder are closely fitted at contact surfaces without shedding and slipping, bending of a whole stepped beam meets an assumption of plane section, and a neutral axis of a mixed section of the toolholder part passes through a center of a circular section, combining with the actual situation of the composite beam of the toolholder part, the equivalent bending stiffness $EI_{eq}$ on a cross section of the composite beam is obtained by the following formula (1):

$$EI_{eq} = E_1 I_1 + E_2 I_2 \quad (1);$$

where $E_1 I_1$ and $E_2 I_2$ represent bending stiffness of the two materials of the toolholder and the tool respectively;

according to knowledge of material mechanics, inertia moment of two circular sections are $$I_1 + \frac{\pi r_1^4}{4} \text{ and } I_2 = \frac{\pi r_2^4}{4}$$

respectively, and equivalent elastic modulus $E_{eq}$ on the cross section of the composite beam of the toolholder part is obtained by the following formula (2):

$$E_{eq} = \frac{E_1 r_1^4 + E_2(r_2^4 - r_1^4)}{r_2^4} = E_2 - (E_2 - E_1)\frac{r_1^4}{r_2^4}; \quad (2)$$

wherein the equivalence of material density of the toolholder part comprising that: a shape of the cross section of the composite beam is composed of a circle and a circular ring, and centroids of the circle and the circular ring coincide; the equivalent material density $\rho_{eq}$ of the toolholder part is obtained by the following formula (3);

$$\rho_{eq} = \frac{\rho_1 A_1 + \rho_2 A_2}{A_1 + A_2} = \rho_2 - (\rho_2 - \rho_1)\frac{r_1^4}{r_2^4}; \quad (3)$$

where $\rho_1$ and $\rho_2$ represent the material density of the toolholder and the tool respectively; $A_1$ and $A_2$ represent the cross section area of the toolholder and the tool respectively, and $A_1 = \pi r_1^2$ and $A_2 = \pi r_2^2$; $r_2$ represents a radius of the cross section of the tool and $r_1$ represents a radius corresponding to a distance from a centroid of the cross section of the toolholder to an outer edge of the toolholder;

wherein the equivalence of the toolholder-tool system comprising that: an inside part of the tool and the toolholder are equivalent to the first segment; section moment of inertia, equivalent elastic modulus, equivalent density, length and cross section area of the equivalent first segment are $I_1$, $E_{eq1}$, $\rho_{eq1}$, $L_1$ and $A_1$ respectively; an outside part of the tool is the second segment, elastic modulus, density, length and cross section area of the second segments are $E_2$, $\rho_2$, $L_2$ and $A_2$ respectively;

wherein the expression of displacement functions comprising that: for a multi-segment Euler beam structure, a vibration equation of beams is a fourth-order differential equation, the displacement functions are expressed by a piecewise function to simplify the calculation and eliminate discontinuity of mechanical variables at ends of beam segments; the displacement functions $w_1(x)$ and $w_2(x)$ for deflection of a two-segment stepped cantilever beam are obtained by the following formula (4):

$$\begin{cases} w_1(x) = a_1 \sin^2(\lambda_1 x) + a_2 \sin^2(\lambda_2 x) & 0 \le x \le L_1 \\ w_2(x) = w_1(x) + \delta(x - L_1)\left[(x - x_0)^2(a_3 + a_4 x + a_5 x^2)\right] & L_1 \le x \le L \end{cases}; \quad (4)$$

where $x \in [0, L]$; $a_1$, $a_2$, $a_3$, $a_4$, and $a_5$ are constants to be determined; $\lambda_n = (2n-1)\pi/4L$; and L represents a sum of length of the first segment and the second segment;

wherein when the formula (1) is used to express a beam deflection, displacements and slopes on both sides at an abrupt changing position of the cross section are equal; the piecewise function is used to represent the displacement functions of the two-segment stepped cantilever beam, the displacement functions $w_1(x)$ and $w_2(x)$ and first-order derivatives corresponding to the slopes thereof keep continuous at the abrupt changing position of the cross section, which is consistent with the actual situation; second derivatives corresponding to section bending moment and third derivatives corresponding to section shear force of the displacement functions $w_1(x)$ and $w_2(x)$ keep discontinuous at the abrupt changing position of the section, which is also consistent with the actual situation;

wherein the solution of natural frequency comprising:
obtaining two potential energy in a continuous two-segment Euler beam structure by the following formula (5):

$$V_p = \frac{1}{2} E_{eq1} I_1 \int_0^{L_1} \left(\frac{d^2 w_1}{dx^2}\right)^2 dx + \frac{1}{2} E_2 I_2 \int_{L_1}^{L} \left(\frac{d^2 w_1}{dx^2}\right)^2 dx; \quad (5)$$

where $V_p$ is strain energy of continuous multi-segment beam structure under arbitrary boundary conditions; $E_i$ and $I_i$ are elastic modulus and section moment of inertia in a i-th segment of a beam, where i=1, 2;

without considering of mass of restraining springs, obtaining kinetic energy of a continuous stepped composite beam by the following formula (6):

$$T = \frac{\omega^2}{2}\left[\rho_{eq1} A_1 \int_0^{L_1} w_1^2 dx + \rho_2 A_2 \int_{L_1}^{L} w_2^2 dx\right]; \quad (6)$$

obtaining Lagrange function of the continuous multi-segment beam structure by the following formula (7):

$$L = V - T \quad (7);$$

where V represents the potential energy of the continuous multi-segment beam structure, and T represents the kinetic energy of the continuous multi segment beam structure;

substituting the formulas from (4) to (6) into the formula (7) to obtain the following expression formula (8) of the Lagrange function L:

$$L = \frac{1}{2} E_{eq1} I_1 \int_0^{L_1} \left(\frac{d^2 w_1}{dx^2}\right)^2 dx + \frac{1}{2} E_2 I_2 \int_{L_1}^{L} \left(\frac{d^2 w_1}{dx^2}\right)^2 dx - \frac{\omega^2}{2}\left[\rho_{eq1} A_1 \int_0^{L_1} w_1^2 dx + \rho_2 A_2 \int_{L_1}^{L} w_2^2 dx\right]; \quad (8)$$

based on Rayleigh-Ritz method, using the Lagrange function to take extreme value for the constants to be determined by the following formula (9):

$$\frac{dL}{da_i} = 0; \quad (9)$$

where i=(1, 2, 3, 4, 5);
obtaining five linear equations from the formula (9), and writing the five linear equations in matrix form to obtain the following formula (10):

$$(K - \omega^2 M) A = 0 \quad (10);$$

where K represents a stiffness matrix; M represents a mass matrix; $\omega$ represents circular frequency; A represents a column vector composed of unknown coefficients in the formula (4), that is:

$$A = [a_1, a_2, a_3, a_4, a_5]^T \quad (11);$$

in order to obtain specific equations of the stiffness matrix K and the mass matrix M, substituting basic functions according to the formula (4) by the following formula (12):

$$\begin{cases} f_1 = \sin^2(\lambda_1 x) \\ f_2 = \sin^2(\lambda_2 x) \\ f_3 = (x - L_1)^2 \\ f_4 = x(x - L_1)^2 \\ f_5 = x^2(x - L_1)^2 \end{cases} \quad (12)$$

then substituting matrices of intermediate basic functions by the following formulas (13) to (16);

$$F_{e1} = 4\begin{bmatrix} \lambda_1^2\sin^2(2\lambda_1 x) & \lambda_1\lambda_2\sin(2\lambda_1 x)\sin(2\lambda_2 x) & 0 & 0 & 0 \\ \lambda_1\lambda_2\sin(2\lambda_1 x)\sin(2\lambda_2 x) & \lambda_2^2\sin^2(2\lambda_2 x) & 0 & 0 & 0 \\ 0 & 0 & 0 & 0 & 0 \\ 0 & 0 & 0 & 0 & 0 \\ 0 & 0 & 0 & 0 & 0 \end{bmatrix}; \quad (13)$$

$$M_{e1} = \begin{bmatrix} \sin^4(\lambda_1 x) & \sin^2(\lambda_1 x)\sin^2(\lambda_2 x) & 0 & 0 & 0 \\ \sin^2(\lambda_1 x)\sin^2(\lambda_2 x) & \sin^4(\lambda_2 x) & 0 & 0 & 0 \\ 0 & 0 & 0 & 0 & 0 \\ 0 & 0 & 0 & 0 & 0 \\ 0 & 0 & 0 & 0 & 0 \end{bmatrix}; \quad (14)$$

$$F_{e2} = \begin{bmatrix} \left(\frac{d^2 f_1}{dx^2}\right)^2 & \frac{d^2 f_1}{dx^2}\frac{d^2 f_2}{dx^2} & \cdots & \frac{d^2 f_1}{dx^2}\frac{d^2 f_5}{dx^2} \\ \frac{d^2 f_2}{dx^2}\frac{d^2 f_1}{dx^2} & \left(\frac{d^2 f_2}{dx^2}\right)^2 & \cdots & \frac{d^2 f_2}{dx^2}\frac{d^2 f_5}{dx^2} \\ \vdots & \vdots & \vdots & \vdots \\ \frac{d^2 f_5}{dx^2}\frac{d^2 f_1}{dx^2} & \frac{d^2 f_5}{dx^2}\frac{d^2 f_2}{dx^2} & \cdots & \left(\frac{d^2 f_5}{dx^2}\right)^2 \end{bmatrix}; \quad (15)$$

$$M_{e2} = \begin{bmatrix} f_1^2 & f_1 f_2 & \cdots & f_1 f_5 \\ f_2 f_1 & f_2^2 & \cdots & f_2 f_5 \\ \vdots & \vdots & \vdots & \vdots \\ f_5 f_1 & f_5 f_2 & \cdots & f_5^2 \end{bmatrix} = \begin{bmatrix} \sin^4(\lambda_1 x) & \sin^2(\lambda_1 x)\sin^2(\lambda_2 x) & \sin^2(\lambda_1 x)(x-L_1)^2 & x\sin^2(\lambda_1 x)(x-L_1)^2 & x^2\sin^2(\lambda_1 x)(x-L_1)^2 \\ \sin^2(\lambda_1 x)\sin^2(\lambda_2 x) & \sin^4(\lambda_2 x) & \sin^2(\lambda_2 x)(x-L_1)^2 & x\sin^2(\lambda_2 x)(x-L_1)^2 & x^2\sin^2(\lambda_2 x)(x-L_1)^2 \\ \sin^2(\lambda_1 x)(x-L_1)^2 & \sin^2(\lambda_2 x)(x-L_1)^2 & (x-L_1)^4 & x(x-L_1)^4 & x^2(x-L_1)^4 \\ \sin^2(\lambda_1 x)x(x-L_1)^2 & \sin^2(\lambda_2 x)x(x-L_1)^2 & x(x-L_1)^4 & x^2(x-L_1)^4 & x^3(x-L_1)^4 \\ \sin^2(\lambda_1 x)x^2(x-L_1)^2 & \sin^2(\lambda_2 x)x^2(x-L_1)^2 & x^2(x-L_1)^4 & x^3(x-L_1)^4 & x^4(x-L_1)^4 \end{bmatrix}; \quad (16)$$

obtaining the stiffness matrix K of a stepped beam by the following formula (17):

$$K = E_{eq1}I_1\int_0^{L_1} F_{e1}dx + E_2 I_2 \int_{L_1}^{L} F_{e2}dx \quad (17);$$

obtaining the mass matrix M of the stepped beam by the following formula (18):

$$M = \rho_{eq1}A_1\int_0^{L_1} M_{e1}dx + \rho_2 A_2 \int_{L_1}^{L} M_{e2}dx \quad (18);$$

wherein a condition for the formula (10) to have at least one non-zero solution is:

$$|K - \omega^2 M| = 0 \quad (19);$$

wherein natural frequency of the two-segment stepped cantilever beam are obtained by solving a matrix eigenvalue problem; substituting eigenvectors corresponding to the natural frequency into the formula (4) to obtain a vibration mode of the two-segment stepped cantilever beam;

wherein the frequency conversion, comprising that: a basic governing equation of a single-span Timoshenko beam is:

$$EI\frac{\partial^4 w}{\partial x^4} + \rho A\frac{\partial^2 w}{\partial t^2} - \rho I\left(1 + \frac{E}{k'G}\right)\frac{\partial^4 w}{\partial x^2 \partial t^2} + \frac{\rho^2 I}{k'G}\frac{\partial^4 w}{\partial t^4} = 0; \quad (20)$$

estimating influences of shear deformation and moment of inertia on a natural frequency of a Timoshenko beam by a simple supported beam; based on a frequency formula of a Timoshenko simple supported beam, then deriving a relationship between natural frequency of the Timoshenko beam and a Euler-Bernoulli beam;

taking a deflection function of the simple supported beam as $$w = \sin\frac{i\pi x}{L},$$

and substituting the deflection function into the formula (20) to obtain the following formula (21):

$$EI\frac{\partial^4 w}{\partial x^4} - \rho A\omega_T^2 w + \rho I\left(1 + \frac{E}{k'G}\right)\omega_T^2\frac{\partial^2 w}{\partial x^2} + \frac{\rho^2 I}{k'G}\omega_T^4 w = 0; \quad (21)$$

where $\omega_T$ represents a natural frequency of bending vibration of the stepped beam based on Timoshenko beam theory, and a unit of $\omega_T$ is radians per second (rad/s); ignoring a last term on a left end of the formula (21) containing small coefficients, and substituting $$\frac{\partial^2 w}{\partial x^2} = -\left(\frac{i\pi}{L}\right)^2 w$$

into the formula (21) to obtain the following formula (22):

$$EI\frac{\partial^4 w}{\partial x^4} - \rho A \omega_T^2 w - \rho I\left(1 + \frac{E}{k'G}\right)\left(\frac{i\pi}{L}\right)^2 w = 0; \quad (22)$$

obtaining the following formula (23) based on Euler-Bernoulli beam theory:

$$EI\frac{\partial^4 w}{\partial x^4} - \rho A \omega_E^2 w = 0; \quad (23)$$

where $\omega_E$ represents a circular frequency of bending vibration of the stepped beam based on the Euler-Bernoulli beam theory; and a unit of $\omega_E$ is rad/s; substituting the formula (23) into the formula (22) to obtain the following formula (24):

$$\rho A(\omega_E^2 - \omega_T^2)w - \rho I\left(1 + \frac{E}{k'G}\right)\left(\frac{i\pi}{L}\right)^2 w = 0; \quad (24)$$

since $$\frac{\partial^2 w}{\partial x^2} = -\left(\frac{i\pi}{L}\right)^2 w \text{ and } \frac{1}{A} = \left(\frac{D}{4}\right)^2$$

when the cross section is a circle, obtaining the following formula (25):

$$\omega_{Ti} = \omega_{Ei}/\sqrt{1 + \left(1 + \frac{E}{k'G}\right)\left(\frac{i\pi D}{4L}\right)^2}; \quad (25)$$

wherein for the two-segment stepped cantilever beam, diameters D, E and G are taken as average values of corresponding values of two cross sections or materials, that is:

$$\begin{cases} D = \frac{D_1 + D_2}{2} \\ E = \frac{E_1 + E_2}{2} \\ G = \frac{G_1 + G_2}{2} \end{cases} \quad (26)$$

thereby obtaining the following conversion formula (27) between the natural frequency of the Timoshenko beam and the Euler-Bernoulli beam:

$$f_{Ti} = f_{Ei}/\sqrt{1 + \left(1 + \frac{E_1 + E_2}{k'(G_1 + G_2)}\right)\left(i\pi\frac{D_1 + D_2}{8L}\right)^2}; \quad (27)$$

where $f_{Ti}$ represents the natural frequency of bending vibration of a i-th order of the stepped beam obtained by a correction calculation based on the Timoshenko beam theory; $f_{Ei}$ represents the natural frequency of bending vibration of a i-th order of the stepped beam obtained by a calculation of the formula (19) based on the Euler-Bernoulli beam theory; both units of $f_{Ti}$ and $f_{Ei}$ are hertz (Hz); and wherein $$\sqrt{1 + \left(1 + \frac{E_1 + E_2}{k'(G_1 + G_2)}\right)\left(i\pi\frac{D_1 + D_2}{8L}\right)^2}$$

of the formula (27) is recorded as a conversion coefficient, which takes into account main effects of moment of inertia and shear deformation.

\* \* \* \* \*